A. H. WOUTERS.
SHAFT OSCILLATOR.
APPLICATION FILED MAR. 6, 1907.
957,289.
Patented May 10, 1910.
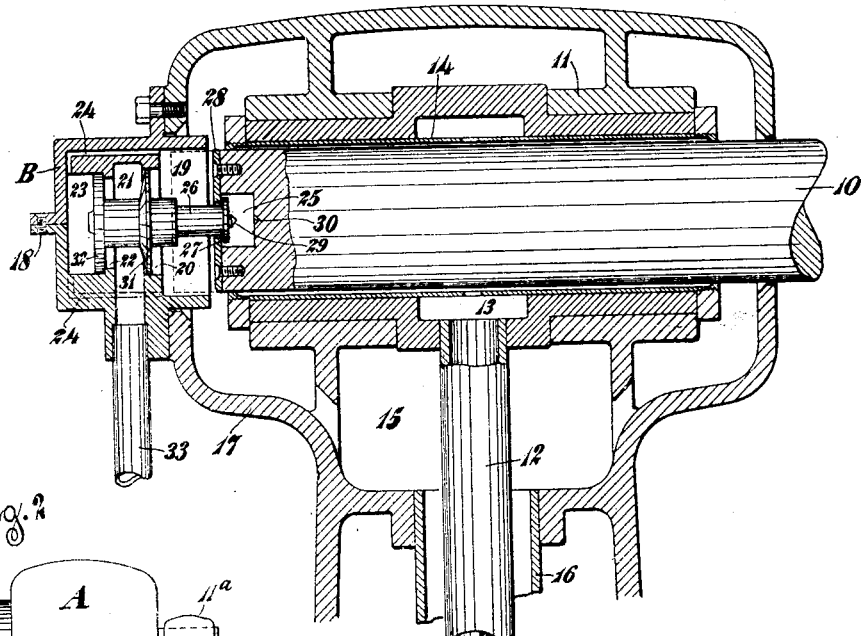
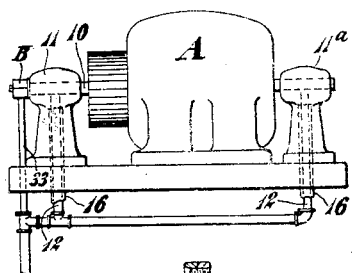
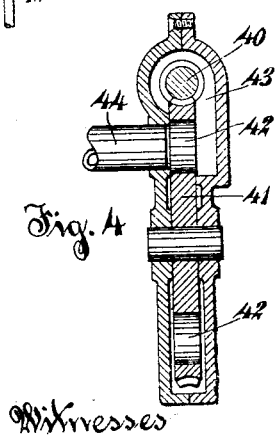
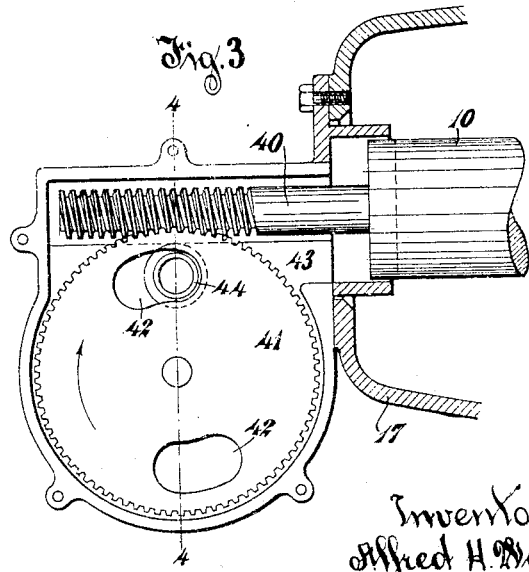
Witnesses
Inventor
Alfred H. Wouters
By
Chas. E. Lord
Attorney

UNITED STATES PATENT OFFICE.

ALFRED H. WOUTERS, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO, JOINTLY.

SHAFT-OSCILLATOR.

957,289.   Specification of Letters Patent.   Patented May 10, 1910.

Application filed March 6, 1907. Serial No. 360,869.

*To all whom it may concern:*

Be it known that I, ALFRED H. WOUTERS, belonging to the Kingdom of the Netherlands, residing at Norwood, in the county of Hamilton and State of Ohio, have invented certain new and useful Improvements in Shaft-Oscillators, of which the following is a full, clear, and exact specification.

My invention relates to shaft oscillators, especially as applied to high speed dynamo-electric machines.

In order to prevent undesirable grooving of the commutators or collector rings of dynamo-electric machines it has been found advisable to give the movable elements of such machines a slight oscillatory motion endwise. In high speed dynamo-electric machines, such as turbo-generators, it is desirable that the means for imparting this endwise oscillation to the shaft shall be as nearly frictionless as possible and shall operate without violence. This is also desirable in shaft oscillators for low speed dynamo-electric machines, though not so necessary.

It is the object of my present invention to provide means whereby this endwise oscillation of the rotatable members of dynamo-electric machines shall be obtained practically without friction or violence and shall moreover be both positive and simple in its operation.

With this object in view my invention comprises an end-play device operated by fluid pressure.

More specifically my invention comprises the combination of a dynamo-electric machine and an oscillator for the rotary member thereof comprising a rotary shaft biased longitudinally in one direction, and means whereby said shaft is recurrently forced in the other direction by fluid pressure.

Other features of my invention will appear from the description and drawings and will be particularly pointed out in the claims.

Figure 1 is a section of a bearing of a dynamo-electric machine showing one form of my shaft oscillator; Fig. 2 shows a dynamo-electric machine provided with the oscillator of Fig. 1; Fig. 3 is a similar view showing a modification of my shaft oscillator; and Fig. 4 is a section along the line 4—4 of Fig. 3.

The shaft 10 of a dynamo-electric machine A is mounted in bearings 11 and 11$^a$. These bearings are shown as high speed bearings in which the lubricating and cooling are done by oil drawn from any suitable source where it is maintained under pressure. The oil under pressure is supplied through a pipe 12 to a chamber 13 around each bearing, whence it is distributed along the shaft by a bushing or bushings 14, escaping at the ends of the bearing to be caught in the chamber 15. Thence it is drawn off by a pipe 16 and pumped back to the original source or otherwise disposed of. As these bearings form no part of my present invention, further description of them is unnecessary.

The above description applies to all the bearings shown, though the bearing in Fig. 3 is only incompletely shown.

Mounted in the end of the housing 17 of the bearing 11 is my improved device B whereby endwise oscillation is imparted to the shaft. In Fig. 1 this device comprises a two-part casing fastened together as at 18 to form a plurality of contiguous and preferably cylindrical chambers 19, 20, 21, 22 and 23, as shown. The chambers 19 and 23 are also preferably connected by one or more openings 24. The chamber 19 is slightly larger in diameter than the shaft 10 and said shaft can move from its right-hand or full line position, when it is just out of said chamber, to its left-hand or dotted line position in the chamber, toward which latter position it has a bias, as by reason of a component of the attraction between the stationary and movable elements of the dynamo-electric machine. For clearness of illustration this endwise movement of the shaft is shown somewhat greater than would generally be required in practice.

In the end of the shaft 10 is a chamber 25 into which extends one end of the movable rod 26. This end of said rod is provided with a flange 27 which is held in place in said chamber by means of a split plate 28 fastened to the end of the shaft 10. A conical extension 29 of the rod 26 can engage a conical depression 30 in the inner end of the chamber 25. On the rod 26 are two other flanges 31 and 32, which fit closely in the chambers 20 and 23 respectively. By means of a pipe 33 the chamber 22 is connected to a source of fluid pressure, this source being preferably the supply of oil under pressure from which the oil for lubricating and cooling the bearing is drawn.

From the position in which it is shown in full lines, the shaft 10 drifts or is drawn to the left, and, as it nears its left-hand limit of movement, engages the projection 29 to move the rod 26 to the left and the flange 31 out of the chamber 20 into the large chamber 21. This admits oil or other fluid under pressure from the chamber 21 to the chamber 19. The pressure of this fluid is sufficient when acting against the end of the shaft 10 to move said shaft from its dotted line position to its full line position, the fluid being supplied to the chamber 19 at a greater rate than it can escape through the space between the shaft 10 and the walls of the chamber 19. As the shaft nears its right-hand limit of movement, the plate 28 engages the flange 27 and moves the rod 26 a short distance to the right to bring the flange 31 into the chamber 20. As soon as this flange enters the chamber 20, the rod 26 will be moved slightly to the right by the pressure of the oil because the flange 31 is a little larger than the flange 32. As the shaft 10 reaches its right-hand limit of movement it passes out of the chamber 19 slightly and allows the oil in said chamber to escape quickly into the chamber 15, whence it returns to the source through the pipe 16.

With the arrangement above described oil is admitted to move the shaft endwise at each oscillation of said shaft endwise. It is impossible in the normal operation of the machine for the parts to get in a position of equilibrium.

The arrangement shown in Figs. 3 and 4 is somewhat different. An extension 40 of the shaft 10, preferably rigidly attached thereto so that a quick opening of the valve may be obtained, is threaded as shown, to form, with the wheel 41, a worm gear. However, the extension need not be rigidly attached to the shaft 10, any form of connection which causes the extension to rotate with the shaft being suitable. The disk 41 is driven in the direction of the arrow by the movement of the shaft 10, and is provided with any desired number of openings 42, through which oil under pressure is admitted into the chamber 43, upon a predetermined number of revolutions of the shaft 10. The oil under pressure is supplied through the pipe 44 from any suitable source, preferably the same source from which oil for lubrication and cooling is supplied. In Fig. 3 the shaft is shown in full lines in its extreme left-hand position, the dotted line showing its extreme right-hand position.

With the arrangement shown in Figs. 3 and 4, the shaft 10 receives an impulse toward the right periodically, the length of the period depending upon the speed of rotation of the shaft.

By the term "periodically" absolutely exact intervals of time are not intended, as the lengths of the periods between different impulses may not be rigidly constant, depending in the arrangement of Fig. 1 on the time required for the shaft 10 to drift back to its extreme left-hand position, and in that of Figs. 3 and 4 on the time required for the shaft to make a predetermined number of revolutions.

Many modifications in the precise arrangements here shown and described can be made without departing from the spirit and scope of my invention, and all such modifications I aim to cover in the following claims.

What I claim as new is:—

1. A shaft oscillator for dynamo-electric machines, comprising a rotary shaft, and means coöperating with said shaft for periodically applying fluid pressure against one end thereof.

2. In combination, a dynamo-electric machine, and an oscillator for the rotary member thereof comprising a rotary shaft, and means controlled by said shaft for intermittently supplying fluid pressure to move said shaft endwise.

3. In combination, a dynamo-electric machine, a shaft therefor, and means coöperating with said shaft whereby the latter during its operation is recurrently moved longitudinally by fluid pressure.

4. In combination, a rotary shaft of a dynamo-electric machine, a constant source of fluid pressure, and means coöperating with said shaft for periodically admitting fluid from said source to move said shaft longitudinally.

5. In combination, a bearing for a dynamo-electric machine, a rotary shaft in said bearing one end of said shaft projecting into a chamber, and means controlled by the motion of the shaft for intermittently supplying fluid pressure to said chamber.

6. In combination, a dynamo-electric machine having a rotary shaft, one end of which shaft projects into a chamber, a source of fluid pressure, a passage between said chamber and said source, a valve in said passage, and means controlled by the motion of the shaft for recurrently opening said valve.

7. An oscillator for dynamo-electric machines, comprising a cylinder, a rotary piston, and means controlled by the movement of said piston for intermittently supplying fluid pressure to said cylinder.

8. In combination, a dynamo-electric machine, and an oscillator for the rotary member thereof comprising a rotary shaft biased longitudinally in one direction, and means coöperating with said shaft whereby the latter is recurrently moved in the other direction by fluid pressure.

9. In combination, a bearing, a rotary shaft in said bearing, a source of oil supply under pressure, connections between said source and said bearing, and means coöperating with said shaft for intermittently admitting oil from said source to move said shaft endwise.

10. In combination, a dynamo-electric machine, a plurality of bearings for the shaft of the rotary member thereof, a source of oil supply under pressure, connections between said source and said bearings, and means coöperating with said rotary member for periodically admitting oil from said source to move said shaft endwise.

11. In combination, a bearing, a rotary shaft in said bearing, a source of fluid pressure, and means coöperating with said shaft for admitting pressure from said source against the end of the shaft to move it axially upon predetermined movements of the shaft.

12. In combination, a dynamo-electric machine, and means for admitting fluid pressure to cause endwise movement of the rotary member of said machine whenever a predetermined movement of said rotary member recurs.

13. In combination, a dynamo-electric machine the rotary member of which has an axial movement and is biased toward one limit of such movement, a source of fluid pressure, and means for admitting fluid pressure from said source at intervals to move said member toward its other limit of movement against its bias.

14. In combination, a dynamo-electric machine whose rotary member has an axial movement and is biased toward one limit of such movement, and means for supplying fluid pressure at short intervals to move said rotary member against its bias.

In testimony whereof I affix my signature, in the presence of two witnesses.

ALFRED H. WOUTERS.

Witnesses:
  Geo. B. Schley,
  Fred J. Kinsey.